United States Patent [19]

Maruyama et al.

[11] Patent Number: 4,882,517
[45] Date of Patent: Nov. 21, 1989

[54] ELECTROLUMINESCENT COMPOSITION CONTAINING ORGANOPOLYSILOXANE AND ELECTROLUMINESCENT DEVICE USABLE AS A BACK-LIGHTING UNIT FOR LIQUID CRYSTAL DISPLAY

[75] Inventors: Kazumasa Maruyama; Tatsushi Kaneko; Tohru Chiba, all of Niigata, Japan

[73] Assignee: Shin-Etsu Chemical Co., Ltd., Tokyo, Japan

[21] Appl. No.: 306,962

[22] Filed: Feb. 7, 1989

[30] Foreign Application Priority Data

Feb. 9, 1988 [JP] Japan .................................. 63-28046

[51] Int. Cl.$^4$ .......................... B32B 9/00; G02F 1/13; H01J 1/63; G09G 3/10
[52] U.S. Cl. .................................... 313/502; 350/345; 313/509; 428/690; 428/917; 315/169.3; 252/301.36; 252/301.6 S
[58] Field of Search ........................ 315/169.3; 358/59; 350/345, 350 R, 350 F; 428/1, 690, 691, 917; 313/506, 502, 509; 252/301.36, 301.33, 301.4 P, 301.4 H, 301.6 S

[56] References Cited

U.S. PATENT DOCUMENTS

| | | | |
|---|---|---|---|
| 2,881,344 | 4/1959 | Michlin | 315/169.3 X |
| 2,972,692 | 2/1961 | Thornton | 315/169.3 X |
| 3,749,977 | 7/1973 | Sliker | 315/169.3 X |
| 4,097,776 | 6/1978 | Allinikov | 428/917 X |
| 4,159,443 | 6/1979 | Stocker et al. | 315/169.3 |
| 4,358,391 | 11/1982 | Fikelmann et al. | 350/341 X |
| 4,410,570 | 10/1983 | Kreuzer et al. | 252/299.01 X |
| 4,413,090 | 11/1983 | Shoji et al. | 428/917 X |
| 4,554,335 | 11/1985 | Sakagami et al. | 428/917 X |
| 4,641,925 | 2/1987 | Gasparaitis et al. | 350/345 |
| 4,769,448 | 9/1988 | Heeger et al. | 252/299.01 X |
| 4,818,913 | 4/1989 | Isaka et al. | 315/169.3 |

FOREIGN PATENT DOCUMENTS 2263446 7/1974 Fed. Rep. of Germany ...... 350/345

Primary Examiner—Stanley D. Miller
Assistant Examiner—Napoleon Thantu
Attorney, Agent, or Firm—Mullen, White & Zelano, P.C.

[57] ABSTRACT

An electroluminescent device of the dispersion type exhibiting high brightness of electroluminescence and having excellent heat resistance and flexibility, and usable as a backlighting unit for liquid crystal displays and as a plane light-emitting body, can be prepared by using, as the matrix material of the particulate electroluminescent material, a specific cyanoalkyl group-containing organopolysiloxane represented by the average unit formula $R^1_a R^2_b SiO_{(4-a-b)/2}$, in which $R^1$ is a cyanoalkyl group having 3 to 5 carbon atoms, $R^2$ is a monovalent hydrocarbon group, a is 0.8 to 1.8 and b is 0 to 1.0 with the proviso that a+b is 1.1 to 1.98.

10 Claims, 1 Drawing Sheet

FIGURE
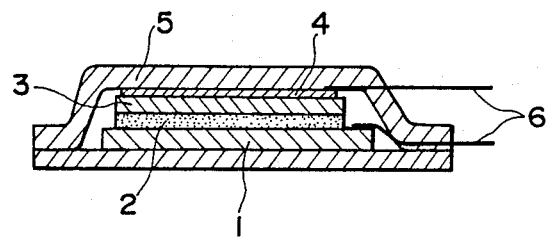

ELECTROLUMINESCENT COMPOSITION CONTAINING ORGANOPOLYSILOXANE AND ELECTROLUMINESCENT DEVICE USABLE AS A BACK-LIGHTING UNIT FOR LIQUID CRYSTAL DISPLAY

BACKGROUND OF THE INVENTION

The present invention relates to an electroluminescent composition and an electroluminescent device having a light-emitting layer of the composition. More particularly, the invention relates to an electroluminescent composition comprising a specific dielectric material as the matrix and a particulate electroluminescent material dispersed in the matrix as well as a dispersion-type electroluminescent device of uniform light emission of high brightness and excellent durability characteristic having a light-emitting layer of the composition.

Different from other types of light-emitting devices, electroluminescent devices in general have a characteristic as a plane light source of low power consumption and are increasingly highlighted in recent years in the applications for illumination and panel display units. Electroluminescent devices are classified depending on the structure of the light-emitting layer into dispersion-type and thin film-type ones, of which the former type ones are now at the starting stage for practical applications as a back of liquid crystal display units, guide light, allnight light and the like by virtue of the advantages such as easiness of preparation, inexpensiveness, shapability into any desired forms and so on.

The light-emitting body of a dispersion-type electroluminescent device is a thin layer formed of a composition comprising a dielectric material as the matrix and a particulate electroluminescent material, such as zinc sulfide, zinc selenide, zinc silicate, boron nitride, silicon carbide and the like, uniformly dispersed in the matrix. The electroluminescent device is prepared basically by coating a substrate to serve as one of the electrodes with a coating liquid which is a dispersion of the particulate electroluminescent material in a solution of the dielectric material to form a thin coating layer and, after evaporation of the solvent, sandwiching the layer with another electrode plate by adhesively bonding with heating under pressure. It is known that the brightness of the electroluminescent layer depends on the dielectric constant of the dielectric material as the matrix and a dielectric material having a larger dielectric constant gives a higher brightness.

The dielectric material of high dielectric constant used for the purpose is usually a polymeric material having a large dielectric constant including cyanoethylated polysaccharides such as cyanoethyl cellulose, cyanoethyl starch, cyanoethyl pullulan and the like, cyanoethylated polysaccharide derivatives such as cyanoethyl hydroxyethyl cellulose, cyanoethyl glycerol pullulan and the like, cyanoethylated polyol compounds such as cyanoethyl poly(vinyl alcohol) and the like and fluorocarbon resins such as poly(vinylidene fluoride) and the like. These conventional high-dielectric polymeric materials, however, have several disadvantages and problems and are not always quite satisfactory as a matrix material for particulate electroluminescent materials.

For example, the cyanoethylated polysaccharides and polysaccharide derivatives and cyanoethyl poly(vinyl alcohol) have a defect in common in the large hygroscopicity. When such a polymeric material is used as the matrix of particulate electroluminescent materials, namely, the electroluminescent material is subject to degradation of the light-emitting efficiency as being affected by the large moisture content of the matrix so that the durability of the electroluminescent device is unavoidably decreased. This undesirable phenomenon can be prevented to some extent by taking a measure for rigorous moisture control and dehumidification of the matrix material in the manufacturing process of the devices although such a measure is undesirable in respect of the productivity of the manufacturing process if not to mention the incompleteness of the effect obtained thereby.

Besides, cyanoethyl cellulose and cyanoethyl starch have a problem in the relatively low adhesive bonding strength to the substrate electrodes sometimes to form a void interstice between the electrode and the light-emitting layer or to cause portion-wise exfoliation of the electrode and the light-emitting layer so that the uniformity in the light emission as one of the characteristic features of electroluminescent devices is greatly decreased. This problem of low adhesive bonding strength can be partly solved by admixing the matrix polymer with a plasticizer but admixture of a plasticizer necessarily results in a decreased dielectric constant and consequent decrease in the brightness as well as a decrease in the durability of the light-emitting body.

Another serious problem in the cyanoethyl hydroxyethyl cellulose, cyanoethyl glycerol pullulan and cyanoethyl poly(vinyl alcohol) is the relatively large temperature dependency of the dielectric constant thereof which sometimes limits the temperature range in which the electroluminescent devices using these polymers as the matrix can be used.

Fluorocarbon resins such as poly(vinylidene fluoride) and the like, on the other hand, are advantageous in respect of their low hygroscopicity and small temperature dependency of their dielectric constant. However, the dielectric constant of the polymers of this class in general is as small as only about a half of that of the cyanoethylated polysaccharides and polysaccharide derivatives so that the brightness of the devices using such a polymer inherently cannot be high enough.

SUMMARY OF THE INVENTION

The present invention accordingly has an object to provide an electroluminescent device free from the above described problems and disadvantages in the prior art and the light-emitting body of the inventive device is a layer formed of a composition which comprise:

(a) a dielectric polymeric material as the matrix mainly composed of an organopolysiloxane represented by tha average unit formula $$R^1_a R^2_b SiO_{(4-a-b)/2'} \qquad (I)$$

in which $R^1$ is a cyanoalkyl group having 3 to 5 carbon atoms, $R^2$ is a monovalent hydrocarbon group or a hydrogen atom, the subscript a is a positive number in the range from 0.8 to 1.8 and the subscript b is zero or a positive number not exceeding 1.0 with the proviso that a+b is in the range from 1.1 to 1.98; and (b) a particulate electroluminescent material dispersed in the matrix.

BRIEF DESCRIPTION OF THE DRAWING

The FIGURE is a vertical cross sectional view of an electroluminescent device according to the present invention.

DETAILED DESCRIPTION OF THE PREFERRED EMBODIMENTS

As is understood from the above given description, the most characteristic feature of the inventive electroluminescent composition consists in the use of a unique dielectric material as the matrix. Namely, the matrix material of the inventive electroluminescent composition is a cyanoalkyl group-containing organopolysiloxane having excellent electric properties such as a large dielectric constant and small dielectric tangent along with low hygroscopicity and good film formability so that an electroluminescent device prepared by using such a dielectric material as the matrix of the electroluminescent layer is freed from the problems and disadvantages in the conventional electroluminescent devices of the prior art.

The particulate electroluminescent material dispersed in the dielectric matrix can be any of known ones including fluorescent materials such as cadmium sulfide CdS, zinc sulfide ZnS, zinc selenide ZnSe, zinc silicate ZnSiO, boron nitride BN, silicon carbide SiC and the like. The particulate electroluminescent material preferably has an average particle diameter not exceeding 50 $\mu$m in respect of the efficiency of light emission of the electroluminescent device prepared therefrom.

The electroluminescent composition of the present invention is prepared by dispersing the above described particulate electroluminescent material in a dielectric material as the matrix mainly composed of a specific cyanoalkyl group-containing organopolysiloxane which is represented by the average unit formula

$$R^1_a R^2_b SiO_{(4-a-b)/2} \qquad (I)$$

In the formula, $R^1$ is a cyanoalkyl group having 3 to 5 carbon atoms such as 2-cyanoethyl, 3-cyanopropyl, 4-cyanobutyl, 2-cyanopropyl, 2-cyanobutyl and 2-methyl-2-cyanopropyl groups. It is optional that two kinds or more of these cyanoalkyl groups are contained in a molecule of the organopolysiloxane. The symbol $R^2$ in the formula denotes a hydrogen atom or a monovalent hydrocarbon group exemplified by alkyl groups, e.g., methyl, ethyl, propyl and butyl groups, cycloalkyl groups, e.g., cyclohexyl group and aryl groups, e.g., phenyl and tolyl groups. The hydrogen atoms in these hydrocarbon groups can be replaced partly or wholly with halogen atoms to give a halogen-substituted hydrocarbon group such as chloromethyl, 3,3,3-trifluoropropyl and 6,6,6-trifluorohexyl groups. The organopolysiloxane as the constituent of the component (a) is imparted with a high dielectric constant by virtue of the highly polar nitrile groups in the cyanoalkyl groups denoted by $R^1$ which are oriented and polarized in an electric field.

In this regard, the subscript a in the average unit formula (I) should be at least 0.8 because an organopolysiloxane of which the value of a is smaller than 0.8 contains only an insufficient amount of the nitrile groups consequertly to have a decreased dielectric constant so that the electroluminescent device prepared by using such an organopolysiloxane as the matrix cannot exhibit full brightness. Although the value of a in the average unit formula (I) is preferably as large as possible in order to have a further increased dielectric constant of the organopolysiloxane, introduction of a large amount of nitrile groups into an organopolysiloxane may cause a difficulty in the industrial manufacture of the organopolysiloxane so that the value of the subscript a is limited in the range from 0.8 to 1.8. The subscript b which relates to the relative content of the groups denoted by $R^2$ does not exceed 1.0 or, preferably, is in the range from 0.01 to 0.1. A value of b larger than the above mentioned upper limit means that the content of the cyanoalkyl groups denoted by $R_1$ relative to the groups $R^2$ is decreased so much to cause a decrease in the dielectric constant in view of the limitation in the value of a+b. Namely, a+b in the average unit formula (I) is in the range from 1.1 to 1.98. When the value of a+b is smaller than 1.1, the organopolysiloxane is in the form of a very brittle resinous material with a highly branched molecular structure so that the light-emitting layer prepared by using such an organopolysiloxane has a poor impact strength to be readily cracked by impact and electroluminescent devices having flexibility cannot be manufactured. When the value of a+b is too large, on the other hand, the organopolysiloxane is in an oily form without film-formability so that it cannot be used as a matrix material of the particulate electroluminescent material.

The cyanoalkyl group-containing organopolysiloxane can be synthesized by any of known methods conventionally undertaken in the art of silicone products. For example, a cyanoalkyl group-containing organic compound is reacted with a hydrolyzable organosilane having a group reactive with the cyanoalkyl compound to prepare a cyanoalkyl group-containing hydrolyzable organosilane compound which is then subjected to hydrolysis and condensation reaction to give a cyanoalkyl group-containing organopolysiloxane. Various types of reactions known in the organosilicon chemistry can of course be applied to the preparation of the organopolysiloxane including the addition reaction, dealcoholation condensation reaction, dehydration condensation reaction and the like with or without addition of a catalyst and/or solvent according to need.

The electroluminescent device of the invention comprises a light-emitting layer formed of a composition comprising a matrix material mainly composed of the above described cyanoalkyl group-containing organopolysiloxane as a dielectric material and a particulate electroluminescent material dispersed in the matrix. The particulate electroluminescent material is dispersed in the matrix by adding the same with agitation to a solution of the cyanoalkyl group-containing organopolysiloxane in an organic solvent which is one or a mixture of acetone, N,N-dimethyl formamide, nitromethane, acetonitrile, N-methyl-2-pyrrolidone and the like followed by evaporation of the solvent. The amount of the particulate electroluminescent material added to the matrix is preferably in the range from 20% to 80% by volume based on the cyanoalkyl group-containing organopolysiloxane. When the amount thereof is too small, the content of the particulate electroluminescent material is too low in the light-emitting layer so that the electroluminescent device having such a light-emitting layer cannot exhibit full brightness. When the amount of the particulate electroluminescent material is too large, on the other hand, difficulties are encountered in obtaining uniform dispersion of the powder in the matrix.

The light-emitting layer of the inventive electroluminescent composition is formed by coating a substrate electrode with a dispersion of the particulate electroluminescent material in a solution of the cyanoalkyl group-containing organopolysiloxane prepared in the above described manner in a coating thickness of, for example, 10 to 70 μm by a known method such as screen printing followed by drying. The electrode substrate, which desirably has transparency, is not particularly limitative to a specific type. A typical electrode substrate is a thin layer of indium oxide as a transparent electroconductive layer formed on a polyester film. It is optional according to need that the above mentioned dispersion of the particulate electroluminescent material is further admixed with known additives including high-dielectric materials, ferroelectric materials, semiconductive oxides and the like.

In the preparation of an electroluminescent device according to the invention, a light-emitting layer is formed on a transparent electrode substrate in the above described manner, an insulating overcoating layer is formed thereon in a conventional manner, a backing electrode is provided thereon by pressing an aluminum foil of 20 to 100 μm thickness at 80 to 180° C. and the transparent electrode and the backing electrode are provided each with a lead wire to serve as an electrode terminal connected to a driving circuit.

A typical electroluminescent device of the invention is illustrated in the figure of the accompanying drawing by a vertical cross section in which a transparent electrode plate 1, which is a film of a plastic resin such as polyester and cellulose acetate or a glass plate coated with a transparent electroconductive film of indium oxide, tin oxide and the like, is provided successively with layers including a light-emitting layer 2, which is formed of a composition comprising a cyanoalkyl group-containing organopolysiloxane as the marix and a particulate electroluminescent material dispersed in the matrix, an insulating layer 3 formed of barium titanate, which serves to increase the dielectric strength of the device and to decrease the voltage dependency of light emission, and a backing electrode 4 made of a foil of aluminum, silver and the like and electrode terminals 6 are connected to the transparent electrode plate 1 and the backing electrode 4 and come out of the casing 5 enveloping the light-emitting assembly.

The electroluminescent device of the invention having the above described structure has several advantages over conventional ones by virtue of the use of a cyanoalkyl group-containing organopolysiloxane as the matrix of the particulate electroluminescent material including: high brightness of light emission and small temperature dependency of brightness; only slight decrease in brightness after prolonged lighting; excellent impact strength with flexibility; and excellent heat resistance with high thermal decomposition temperature. Accordingly, the electroluminescent device of the invention is useful in various industrial applications not only as a backlight of liquid crystal displays but also as a plane light emitting body.

In the following, the present invention is described in more detail by first giving synthetic examples for the preparation of the cyanoalkyl group-containing organopolysiloxanes as the dielectric matrix material of a particulate electroluminescent material and then giving examples of the electroluminescent devices prepared by using the matrix material. Synthetic Preparations.

In Preparation 1, 15.9 g of 2-cyanoethyl methyl dimethoxy silane as a difunctionally hydrolyzable silane and 21.7 g of 2-cyanoethyl triethoxy silane as a trifunctionally hydrolyzable silane were introduced into a three-necked flask of 100 ml capacity and an aqueous solution prepared by adding 0.30 ml of a 15% aqueous solution of tetramethyl ammonium hydroxide to 9 g of pure water was added dropwise to the silane mixture in the flask under agitation and, when a homogeneous solution had been formed in the flask, the mixture was heated at 90° C. for 2 hours to effect cohydrolysis and condensation of the silanes. The resultant product was a semi-solid transparent material which could be identified by chemical analysis to be an organopolysiloxane containing 2-cyanoethyl groups in an amount approximately corresponding to the formulation of the starting silane mixture.

The synthetic procedure in Preparations 2 and 3 was substantially the same as above excepting modification of the formulation of the reaction mixture that the amounts of the 2-cyanoethyl methyl dimethoxy silane, 2-cyanoethyl triethoxy silane and water were 9.5 g, 30.4 g and 10 g, respectively, in Preparation 2 and 6.4 g, 34.7 g and 12 g, respectively, in Preparation 3. The molar ratios of the difunctionally hydrolyzable silane to the trifunctionally hydrolyzable silane were 0.43 and 0.25 in Preparations 2 and 3, respectively, while the ratio was 1.0 in Preparation 1. Consequently, the products obtained in Preparations 2 and 3 were solid rather than semi-solid.

Each of the thus prepared cyanoethyl group-containing organopolysiloxanes was dissolved in acetone and a film of the organopolysiloxane having a thickness of about 0.10 mm was prepared from the solution by casting followed by drying at 80° C. for 4 hours. The organopolysiloxane films were subjected to the measurements of the dielectric properties, i.e. dielectric constant and dielectric tangent, at 20° C. and a frequency of 1 kHz, mechanical properties, i.e. tensile strength and ultimate elongation, at room temperature, amount of moisture absorption after keeping for 120 hours in an atmosphere of 25° C. and 75% relative humidity and thermal decomposition temperature in air to give the results shown in Table 1 to follow.

For comparison, further films were prepared from a cyanoethyl cellulose (Acrylocel, a product by Tel Systems Inc., U.S.A.) and a cyanoethylated poly(vinyl alcohol) obtained according to the procedure described in Journal of Electrochemical Society, volume 111, No. 11, pages 1239–1243 (1964), referred to as CEC and CPVA, respectively, hereinbelow, and these comparative films were subjected to the measurements of the properties in the same manner as above to give the results also shown in Table 1.

TABLE 1

| Sample | Preparation 1 | Preparation 2 | Preparation 3 | CEC | CPVA |
|---|---|---|---|---|---|
| Dielectric constant | 27 | 25 | 23 | 15 | 18 |
| Dielectric tangent | 0.052 | 0.045 | 0.036 | 0.036 | 0.070 |
| Tensile strength, kg/cm$^2$ | 50 | 250 | 430 | 310 | 50 |
| Ultimate elongation, % | >500 | 100 | 1.8 | 1.5 | >500 |
| Moisture absorption, % | 1.3 | 1.3 | 1.2 | 5.0 | 4.7 |
| Thermal decomposition temperature, °C. | 350 | 350 | 390 | 250 | 230 |

EXAMPLES

Solutions were prepared by dissolving each 80 g of the cyanoethyl group-containing organopolysiloxanes obtained in the same manner as in Preparations 1 to 3 described above in 120 g of N,N-dimethyl formamide. A half portion of each solution was admixed with an electroluminescent zinc sulfide-based fluoreacent material of the formula ZnS:CuAl having an average particle diameter of 20 μm in an aount of 40% by volume based on the organopolysiloxane to give a coating disparsion for electroluminescent light-emitting layer. Separately, the other half portion of the solution was admixed with barium titanate having a particle diameter of 1 to 2 μm in an amount of 40% by volume based on the organopolysiloxane to give a coating dispersion for dielectric insulating layer.

A transparent electrode substrate was prepared by providing a glass plate of 50 mm by 50 mm wide with a thin film of indium oxide having a thickness of 200 nm by the method of vapor deposition and coated successively first with the above prepared coating dispersion for light-emitting layer by screen printing in a thickness of about 40 μm as dried followed by drying at 150° C. for 4 hours and then with the coating dispersion for insulating layer by screen printing in a thickness of about 15 μm as dried followed by drying at 150° C. for 4 hours. Further, an aluminum foil of 50 μm thickness was applied and bonded to the insulating layer at 170° C. under a pressure of 10 kg/cm² as a backing electrode. Lead wires to serve as the electrode terminals were connected to the transparent electrode and the backing electrode and the thus prepared light-emitting assembly was encapsulated at 220° C. with a sheet of a poly(- chloro trifluoro ethylene) (Acrer, a product by Allied Chemical Co.) to complete en electroluminescent device. In this manner, three electroluminescent devices I, II and III were prepared from the cyanoethyl group-containing organopolysiloxanes obtained in Preparations 1, 2 and 3, respectively. Two more electroluminescent devices IV and V were prepared in the same manner as above excepting replacement of the cyanoethyl group-containing organopolysiloxane with the same cyanoethyl cellulose or cyanoethylated poly(vinyl alcohol) shown in Table 1, respectively, as dissolved in N,N-dimethyl formamide in a concentration of 20% by weight to serve as the dispersion medium of the particulate electroluminescent material or barium titanate.

Evaluation of these electroluminescent devices I to V was undertaken by connecting the lead wires of each device to a AC power source of 100 volts at a frequency of 400 Hz to determine the initial brightness and the half life period which was the length of time taken until the brightness of the electroluminescence was decreased to a half of the initial value when the electroluminescent device under power impression in the above mentioned conditions was kept in an atmosphere of 40° C. and 90% relative humidity. The results are shown in Table 2 below.

TABLE 2

| Electroluminescent device No. | Initial brightness, ft. · L | Half life period, hours |
|---|---|---|
| I | 40 | 390 |
| II | 34 | 450 |
| III | 28 | 580 |
| IV | 16 | 360 |
| V | 18 | 270 |

What is claimed is:

1. An electroluminescent composition which comprises:
   (a) a dielectric material as a matrix mainly composed of a cyanoalkyl group-containing organopolysiloxane represented by the average unit formula $R^1_a R^2_b SiO_{(4-a-b)/2}$ in which $R^1$ is a cyanoalkyl group having 3 to 5 carbon atoms, $R^2$ is a hydrogen atom or a monovalent hydrocarbon group, the subscript a is a positive number in the range from 0.8 to 1.8 and the subscript b is zero or a positive number not exceeding 1.0 with the proviso that a+b is in the range from 1.1 to 1.98; and
   (b) a particulate electroluminescent material dispersed in the matrix.

2. The electroluminescent composition as claimed in claim 1 wherein the amount of the particulate electroluminescent material is in the range from 20 to 80% by volume based on the dielectric material as the matrix.

3. The electroluminescent composition as claimed in claim 1 wherein the cyanoalkyl group is 2-cyanoethyl group.

4. The electroluminescent composition as claimed in claim 1 wherein the subscript b is a positive number in the range from 0.01 to 0.1.

5. The electroluminescent composition as claimad in claim 1 wherein the particulate electroluminescent material has an average particle diameter not exceeding 50 μm.

6. The electroluminescent composition as claimed in claim 1 wherein the particulate electroluminescent material is selected from the group consisting of cadmium sulfide, zinc sulfide, zinc selenide, zinc silicate, boron nitride and silicon carbide.

7. An electroluminescent device which comprises:
   (A) a layer of an electroluminescent composition comprising
      (a) a dielectric material as a matrix mainly composed of a cyanoalkyl group-containing organopolysiloxane represented by the average unit formula $R^1_a R^2_b SiO_{(4-a-b)/2}$ in which $R^1$ is a cyanoalkyl group having 3 to 5 carbon atoms, $R^2$ is a hydrogen atom or a monovalent hydrocarbon group, the subscript a is a positive number in the range from 0.8 to 1.8 and the subscript b is zero or a positive number not exceeding 1.0 with the proviso that a+b is in the range from 1.1 to 1.98, and
      (b) a particulate electroluminescent material dispersed in the matrix; and
   (B) two electrode plates sandwiching the layer of the electroluminescent composition.

8. The electroluminescent device as claimed in claim 7 wherein the layer of the electroluminescent composition has a thickness in the range from 10 to 70 μm.

9. The electroluminescent device as claimed in claim 7 wherein one of the electrode plates is transparent, the other being opaque.

10. The electroluminescent device as claimed in claim 9 wherein an electrically insulating layer is interposed between the layer of the electroluminescent composition and the opaque electrode plate.

* * * * *